United States Patent
Kimura

(10) Patent No.: US 9,531,960 B2
(45) Date of Patent: Dec. 27, 2016

(54) IMAGING APPARATUS FOR GENERATING HDR IMAGE FROM IMAGES CAPTURED AT DIFFERENT VIEWPOINTS AND METHOD FOR CONTROLLING IMAGING APPARATUS

(71) Applicant: CANON KABUSHIKI KAISHA, Tokyo (JP)

(72) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/575,086

(22) Filed: Dec. 18, 2014

(65) Prior Publication Data
US 2015/0181103 A1  Jun. 25, 2015

(30) Foreign Application Priority Data

Dec. 25, 2013 (JP) .................. 2013-267152
Sep. 12, 2014 (JP) .................. 2014-186868

(51) Int. Cl.
| | | |
|---|---|---|
| H04N 5/235 | (2006.01) | |
| H04N 5/232 | (2006.01) | |
| H04N 5/238 | (2006.01) | |
| H04N 5/357 | (2011.01) | |
| H04N 5/369 | (2011.01) | |

(52) U.S. Cl.
CPC ............ *H04N 5/2355* (2013.01); *H04N 5/238* (2013.01); *H04N 5/23258* (2013.01); *H04N 5/23287* (2013.01); *H04N 5/3572* (2013.01); *H04N 5/3696* (2013.01)

(58) Field of Classification Search
CPC .................................................. H04N 5/2355
See application file for complete search history.

(56) References Cited

U.S. PATENT DOCUMENTS

| | | | |
|---|---|---|---|
| 9,264,610 B2* | 2/2016 | Duparre | H04N 5/23232 |
| 2015/0077622 A1* | 3/2015 | Ueno | G02B 13/0055 348/360 |

FOREIGN PATENT DOCUMENTS

| | | |
|---|---|---|
| JP | 2003-179819 A | 6/2003 |
| JP | 2013-072906 A | 4/2013 |

* cited by examiner

*Primary Examiner* — James Hannett
(74) *Attorney, Agent, or Firm* — Canon USA Inc., IP Division

(57) ABSTRACT

An imaging apparatus includes an image sensor including a microlens array between an imaging optical system and a plurality of pixels and configured to receive a light flux from each of microlenses in the microlens array at the plurality of pixels to output an image signal, and a generation unit configured to select, among a plurality of pixel signals obtained at different viewpoints corresponding to a subject in the image signal from the image sensor, the pixel signal based on the brightness of the pixel signal serving as a reference and positions of the pixels at which the plurality of pixel signals are output relative to each of the microlenses, to generate an output image.

16 Claims, 11 Drawing Sheets

FIG.2A
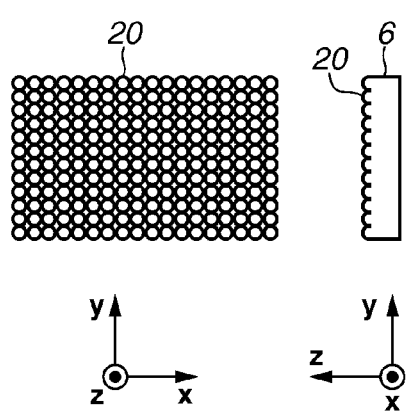
FIG.2B
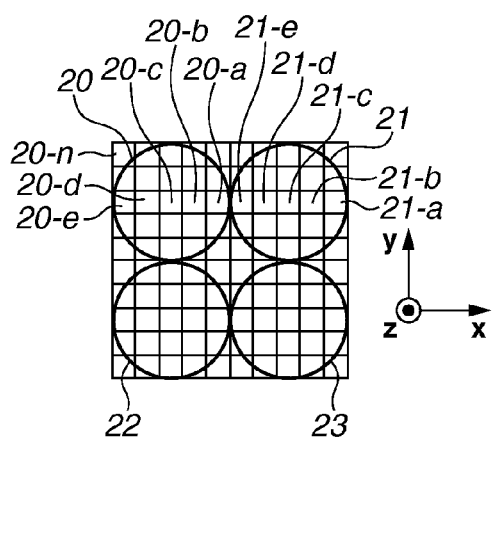
FIG.2C
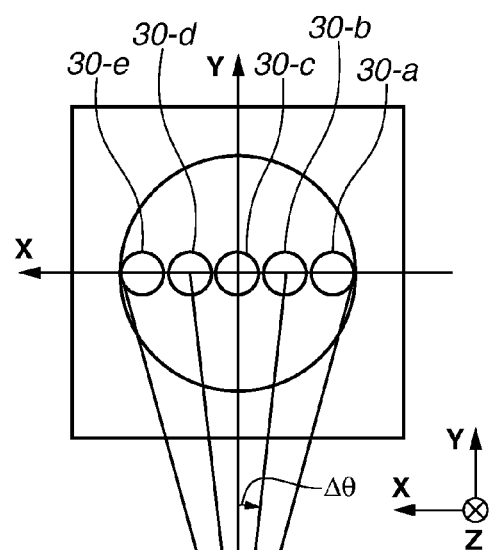
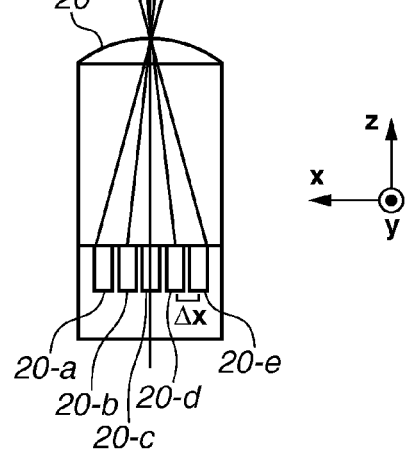

P(1,1), P(1,5), P(5,1), P(5,5)  - Group1

P(1,2), P(1,4), P(2,1), P(2,5),
P(4,1), P(4,5), P(5,2), P(5,4)  } - Group2

P(1,3), P(2,2), P(2,3), P(2,4),
P(3,1), P(3,2), P(3,3), P(3,4),
P(3,5), P(4,2), P(4,3), P(4,4),
P(5,3)  } - Group3

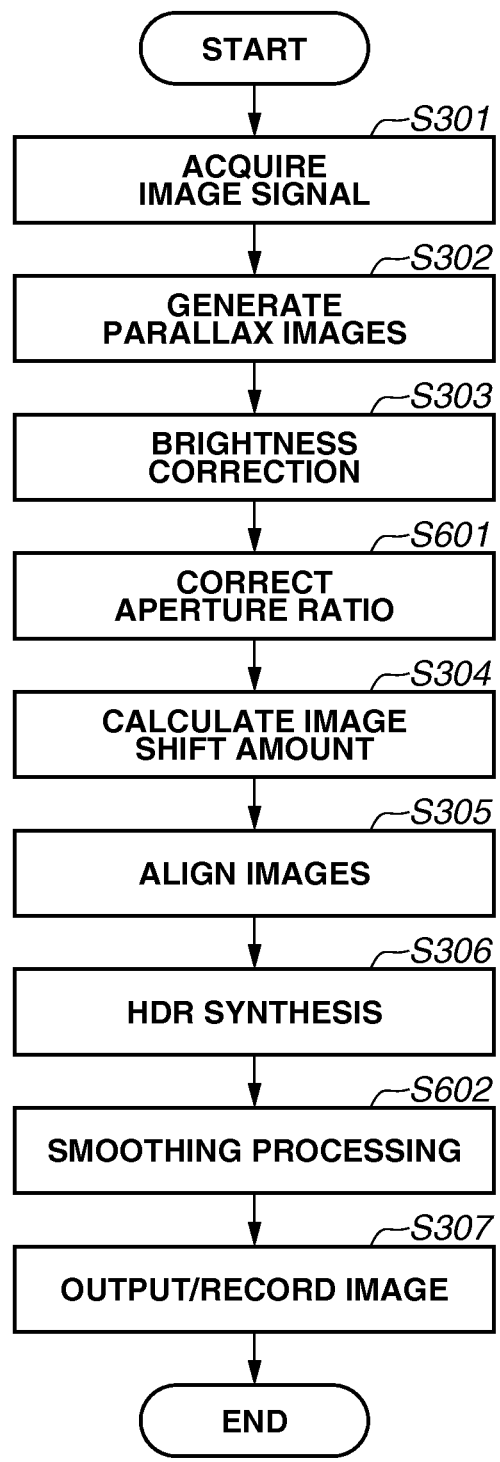

IMAGING APPARATUS FOR GENERATING HDR IMAGE FROM IMAGES CAPTURED AT DIFFERENT VIEWPOINTS AND METHOD FOR CONTROLLING IMAGING APPARATUS

BACKGROUND OF THE INVENTION

1. Field of the Invention

The present invention relates to an imaging apparatus capable of simultaneously acquiring images from different viewpoints and of generating a high dynamic range image based on the acquired images; it also relates to a method for controlling the imaging apparatus.

2. Description of the Related Art

Conventionally, Japanese Patent Application Laid-Open No. 2003-179819 discusses, in order to generate an image having a high dynamic range (HDR) apparently wider than a dynamic range of an image, which can be acquired by performing imaging once, a technique for regularly arranging pixels with different aperture ratios and generating the HDR image.

Japanese Patent Application Laid-Open No. 2013-072906 discusses a configuration of an imaging apparatus capable of acquiring images captured at different viewpoints by performing imaging once, in which a pair of subject images formed by light fluxes passing through different pupil areas is acquired and the acquired pair of subject images is used to detect a focus using correlation calculation.

However, there has been no reference to generation of an HDR image using the configuration of the imaging apparatus discussed in Japanese Patent Application Laid-Open No. 2013-072906, i.e., an image sensor including a plurality of pupil division pixels assigned to one microlens.

SUMMARY OF THE INVENTION

The present invention is directed to an imaging apparatus including an image sensor including a plurality of pupil division pixels assigned to one microlens and capable of providing an HDR image, and a method for controlling the imaging apparatus.

According to an aspect of the present invention, an imaging apparatus includes an image sensor including a microlens array between an imaging optical system and a plurality of pixels and configured to receive a light flux from each of microlenses in the microlens array at the plurality of pixels to output an image signal, and a generation unit configured to select, among a plurality of pixel signals captured at different viewpoints corresponding to a subject in the image signal from the image sensor, the pixel signal based on the brightness of the pixel signal and positions of the pixels at which the plurality of pixel signals are output relative to each of the microlenses, to generate an output image.

According to another aspect of the present invention, a method for controlling an imaging apparatus including an image sensor including a microlens array between an imaging optical system and a plurality of pixels and configured to receive a light flux from each of microlenses in the microlens array at the plurality of pixels to output an image signal, includes specifying a plurality of pixel signals obtained at different viewpoints corresponding to a subject in the image signal from the image sensor, selecting the pixel signals based on the brightness of the pixel signals and positions of the plurality of pixels relative to each of the microlenses, and generating an output image using the selected pixel signals Further features of the present invention will become apparent from the following description of exemplary embodiments with reference to the attached drawings.

BRIEF DESCRIPTION OF THE DRAWINGS

FIGS. 2A, 2B, and 2C illustrate an imaging optical system according to the first exemplary embodiment.

FIG. 6 is a flowchart illustrating a process of generating an image based on images acquired simultaneously from different viewpoints, according to a third exemplary embodiment.

DESCRIPTION OF THE EMBODIMENTS

Various exemplary embodiments, features, and aspects of the invention will be described in detail below with reference to the drawings. An imaging apparatus according to a first exemplary embodiment of the present invention will be described below with reference to FIGS. 1A to 5B.

Figure 1A:
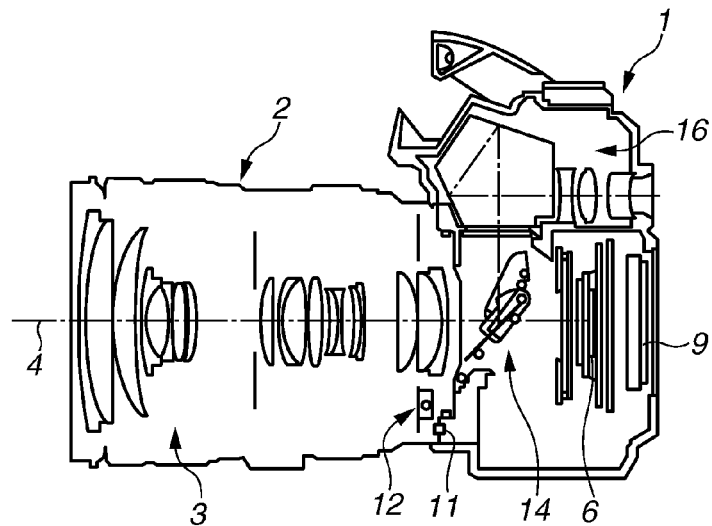
FIG. 1A is a cross-sectional view and FIG. 1B is a functional block diagram of an imaging apparatus, according to a first exemplary embodiment.
Figure 1B:
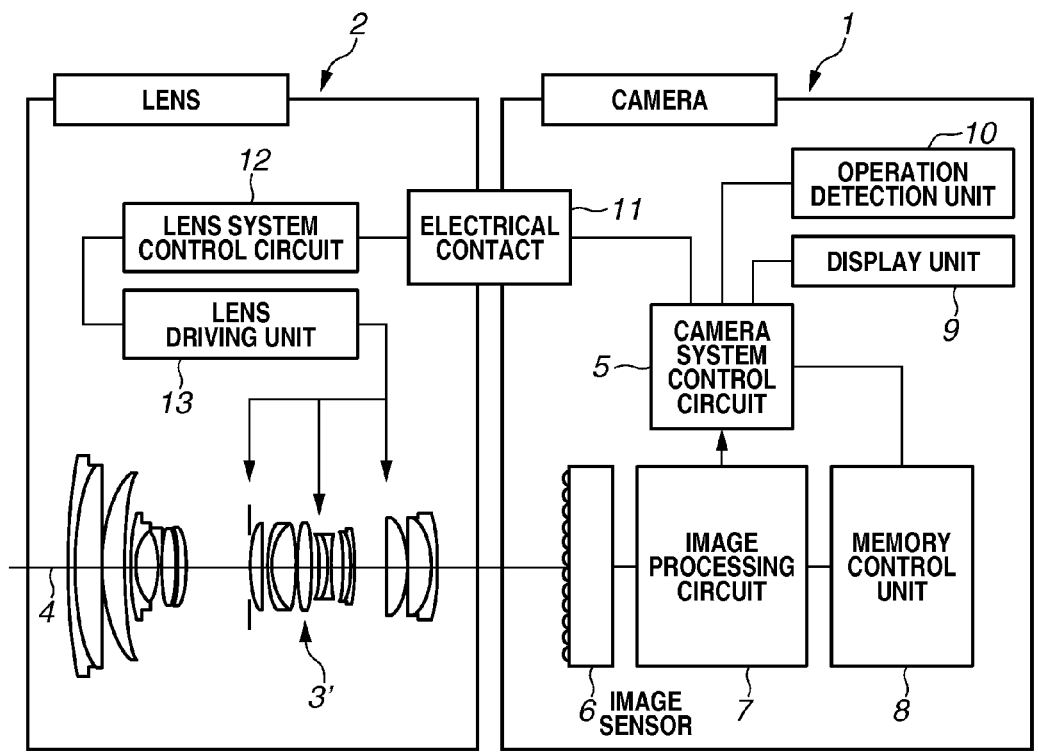

FIG. 1A is a cross-sectional view taken parallel to optical axis 4 at the center of a digital camera serving as an imaging apparatus 1 and a lens 2. FIG. 1B is a functional block diagram mainly illustrating an electrical configuration. In FIGS. 1A and 1B, components respectively assigned the same reference numerals correspond to each other.

In FIG. 1A, an imaging apparatus 1 includes an image sensor 6, a display device 9, a quick return mechanism 14, and a finder 16. The image sensor 6 is a single-plate color image sensor including a complementary metal oxide semiconductor (CMOS) sensor with a primary color filter, for example. The primary color filter includes three types of color filters of red (R), green (G), and blue (B) respectively having transmission main wavelength bands in the vicinity of 650 nm, 550 nm, and 450 nm. The display device 9 is a display medium such as a liquid crystal display. The quick return mechanism 14 has a mirror. This mirror is rotated, to selectively introduce a light flux incident via an imaging optical system 3 to the optical finder 16 or the image sensor 6. A lens unit 2 including the imaging lens 3' forming the imaging optical system 3 can be electrically connected via an electrical contact 11 to and detachably attached to the imaging apparatus 1.

An image processing circuit 7 is a processing system for processing an image formed on an imaging plane of the image sensor 6 via the imaging optical system 3. Microlenses (hereinafter also referred to as MLs) are arranged in a lattice shape in two dimensions, as viewed in an optical axis direction, between the image sensor 6 and the imaging lens 3' forming the imaging optical system 3 (on a surface of the image sensor 6 according to the present exemplary embodiment), to form a so-called microlens array (hereinafter also referred to as MLA). The MLA performs a pupil division function in the present exemplary embodiment. In the present exemplary embodiment, pixels (light receiving units) on the image sensor 6 have the same color filter in each ML unit, arranged in a Bayer array. However, the present invention is not limited to this. The pixels may be in a Bayer array in pixel unit, like in a normal image sensor. However, in this case, the pixels assigned to each of the MLs may include an odd number of pixels arranged in each of the vertical and the horizontal directions of a lattice corresponding to the ML. If the pixels are assigned in units of odd numbers, the pixels at corresponding viewpoints under the adjacent MLs have alternately different color filters. Details of a function and an arrangement of the MLA will be described below with reference to FIGS. 2A to 2C. As described below, a focus evaluation value and an appropriate exposure value are obtained from the image sensor 6. Thus, the imaging optical system 3 is appropriately adjusted based on the focus evaluation and exposure values, so that the image sensor 6 is exposed to subject light with an appropriate light amount while a subject image is formed on the image sensor 6.

The image processing circuit 7 includes non-illustrated components, such as an analog-to-digital (A/D) converter, a white balance circuit, a gamma correction circuit, an interpolation calculation circuit, and a color conversion circuit using a look-up table. The image processing circuit 7 receives an electrical signal from the image sensor 6 and can generate image signals for display and recording using these circuits. The image processing circuit 7 can also include an image processing device (a parallax image generation unit, a luminance correction unit, an alignment unit, a pixel selection unit, an output image generation unit, etc.) serving as a principal part of the image processing apparatus in the present exemplary embodiment. In the present exemplary embodiment, it is assumed that the elements are arranged in the camera system control circuit 5.

A memory control unit 8 includes a processing circuit required for recording in addition to an actual storage unit. The memory control unit 8 performs output while generating and storing an image to be output to a display unit 9. The memory control unit 8 compresses an image, a moving image, and sound (e.g., voice) using a previously determined or known method.

A camera system control circuit 5 generates a timing signal or the like during imaging, and outputs the generated timing signal. The camera system control circuit 5 controls an imaging system, an image processing system, and a recording and reproduction system, in response to external operations. An operation detection unit 10 detects that a shutter release button (not illustrated) is pressed, and controls driving of the image sensor 6, an operation of the image processing circuit 7, and compression processing of the memory control unit 8, for example. Further, the camera system control circuit 5 controls a state of each segment of an information display device that displays information on a liquid crystal monitor using the display unit 9.

An operation for adjusting an optical system by a control system will be described. The image processing circuit 7 is connected to the camera system control circuit 5. The camera system control circuit 5 obtains an appropriate focus position and diaphragm position and level of opening (diameter) based on the signal from the image sensor 6. The camera system control circuit 5 issues an instruction to a lens system control circuit 12 via the electrical contact 11. The lens system control circuit 12 appropriately controls a lens driving unit 13. Further, a camera shake detection sensor (not illustrated) is further connected to the lens system control circuit 12. In a mode in which the camera shake correction is performed, the lens system control circuit 12 appropriately controls a shake correction lens via the lens driving unit 13 based on a signal of the camera shake detection sensor.

FIGS. 2A, 2B, and 2C illustrate a principal part of the imaging optical system 3 according to the present exemplary embodiment. While the present invention is also applicable to another imaging optical system, the other imaging optical system will be described with reference to FIGS. 4A, 4B, 4C, 4D, 4E, and 4F. To apply the present invention, subject images from a plurality of viewpoints need to be acquired. In the present exemplary embodiment, an MLA is arranged in the vicinity of an imaging plane of the imaging optical system 3 to acquire angular information while a plurality of pixels is associated with one of MLs constituting the MLA.

FIG. 2A schematically illustrates a relationship between the image sensor 6 and an MLA 20. FIG. 2B is a schematic diagram illustrating the pixels (squares) on the image sensor 6 and the MLA including micro lenses 20, 21, 22, and 23. FIG. 2C indicates that pixels under the MLA 20 are respectively associated with specific pupil areas.

As illustrated in FIG. 2A, the MLA 20 is provided on the image sensor 6, and a front-side principal point of the MLA 20 is arranged to be in close proximity to the imaging plane of the imaging optical system 3. FIG. 2A illustrates states of the MLA 20, respectively, as viewed from the side and the front of the imaging apparatus 1. A lens of the MLA 20 is arranged to cover the pixels on the image sensor 6 when viewed from the front of the imaging apparatus 1. While each of the MLs constituting the MLA 20 is drawn large to be easily seen in FIG. 2A, the ML is actually only approximately several times the size of the pixel (the actual size will be described with reference to FIG. 2B).

FIG. 2B is a partially enlarged view of the relationship between pixels and the microlens array, as viewed from the front of the imaging apparatus 1. A lattice-shaped frame illustrated in FIG. 2B represents the two-dimensional arrangement of each of the pixels on the image sensor 6. On the other hand, circles 20, 21, 22, and 23 respectively represent the MLs constituting the MLA 20. As apparent from FIG. 2B, a plurality of pixels is assigned to one of the MLs. In an example illustrated in FIG. 2B, up to 25 pixels of 5 rows×5 columns are assigned to one ML. More specifically, the size of each of the MLs is approximately 5 times the size of the pixel. However, the size of the ML depends on a distance between the MLA 20 and the pixel on the image sensor 6, and therefore the number of pixels in the sensor corresponding to each ML may vary.

FIG. 2C illustrates a cross-section of the image sensor 6 cut to include an ML optical axis and to make its longitudinal direction match a horizontal direction of the figure. In FIG. 2C, the image sensor 6 includes pixels (photoelectric conversion units) 20-$a$, 20-$b$, 20-$c$, 20-$d$, and 20-$e$. On the other hand, an exit pupil plane of the imaging optical system 3 is illustrated in an upper part of FIG. 2C. Actually, while a direction of the exit pupil plane is a direction perpendicular to the paper surface of FIG. 2C when made to match the direction of the image sensor 6 illustrated in a lower part of FIG. 2C, its projection direction is changed for ease of description. In FIG. 2C, one-dimensional projection/signal processing will be described to simplify the description. In the actual imaging apparatus 1, the one dimension can easily be expanded to two dimensions.

The pixels 20-*a*, 20-*b*, 20-*c*, 20-*d*, and 20-*e* illustrated in FIG. 2C are respectively in corresponding positional relationships with pixels 20-*a*, 20-*b*, 20-*c*, 20-*d*, and 20-*e* illustrated in FIG. 2B. As illustrated in FIG. 2C, each of the pixels is designed to be conjugate to a specific area on the exit pupil plane of the imaging optical system 3 by the MLA 20. In the example illustrated in FIG. 2C, the pixels 20-*a*, 20-*b*, 20-*c*, 20-*d*, 20-*e* respectively correspond to areas 30-*a*, 30-*b*, 30-*c*, 30-*d*, and 30-*e* of the exit pupil plane. More specifically, only a light flux, which has passed through the area 30-*a* on the exit pupil plane of the imaging optical system 3, is incident on the pixel 20-*a*. The same is true for the other pixels 20-*b* to 20-*e* as each corresponds to pupil areas 30-*b* to 30-*e*. Further, pixels in the adjacent ML also correspond to the same areas on the exit pupil plane. That is, pixels 21-*a*, 21-*b*, 21-*c*, and 21-*d* respectively correspond to the areas 30-*a*, 30-*b*, 30-*c*, and 30-*d*. As a result, angular information can be acquired from a positional relationship between the area on the exit pupil plane and the pixel on the image sensor 6.

To generate a plurality of images captured at different viewpoints from the optical system described in FIGS. 2A, 2B, and 2C, pixels respectively corresponding to the same pupil planes (pupil areas) of MLs are arranged while making use of the above-mentioned characteristics. Thus, the plurality of images at the different viewpoints is generated.

While in the above-mentioned digital camera capable of acquiring the plurality of images at the different viewpoints, movement of a focus position after imaging and movement of the viewpoints have been proposed, the present exemplary embodiment is directed to expanding a dynamic range (high dynamic range synthesis, also referred to as HDR synthesis). In the optical system according to the present exemplary embodiment, the plurality of images at the different viewpoints can simultaneously be acquired. Thus, even if a moving subject is imaged, a moving subject image can be unblurred. In the present exemplary embodiment, the plurality of images at the different viewpoints (parallax images) is acquired in the above-mentioned configuration, and the HDR synthesis is performed based on a difference in shading state for each of the images.

A difference in shading state for each of the pixels under the ML (a difference in shading state among the images at the different viewpoints), used in the present exemplary embodiment, will be described below. As illustrated in FIGS. 2B and 2C, in the imaging optical system 3, each of the pixels corresponds to a specific area of an exit pupil of the imaging lens 3' by the MLA 20. A diaphragm for defining an F number exists in the imaging optical system 3. Thus, a light beam does not reach the imaging optical system 3 from outside thereof. More specifically, the entire pixel area of each of the pixels 20-*b*, 20-*c*, and 20-*d* corresponds to the exit pupil. However, a part of each of the pixels 20-*a*, 20-*e*, and 20-*n* does not correspond to the exit pupil. Thus, light fluxes, which reach the pixels 20-*a*, 20-*e*, and 20-*n*, are more limited by the imaging optical system than light fluxes which reach the pixels 20-*b*, 20-*c*, and 20-*d*. This is referred to as shading.

A ratio corresponding to the exit pupil in the pixel area is defined as an aperture ratio in the present specification. Since all the pixel areas of the pixels 20-*b*, 20-*c*, and 20-*d* correspond to the exit pupil, the aperture ratios of the pixels 20-*b*, 20-*c*, and 20-*d* are 100%. The aperture ratios of the pixels 20-*a*, 20-*e*, and 20-*n* are less than 100%. Further, the aperture ratio of the pixel 20-*n* is less than the aperture ratios of the pixels 20-*a* and 20-*e*.

The aperture ratio corresponds to an amount of light flux incident on each of the pixels as compared to the amount of light flux arriving to the pupil plane of the optical system, and it is based on the corresponding pupil area. More specifically, the aperture ratio corresponds to the brightness of each of the plurality of images captured at the different viewpoints. In the example illustrated in FIG. 2B, the brightness of the image at the viewpoint corresponding to the pixel 20-*n* (an outer edge of the pupil area) is approximately one-seventh the brightnesses of the images at the viewpoints corresponding to the pixels 20-*b*, 20-*c*, and 20-*d*. As described above, according to the present exemplary embodiment, an HDR image, which has been subjected to dynamic range expansion, is generated using a difference in exposure due to the difference in aperture ratio.

When the subject is bright, the images at the viewpoints corresponding to the pixels 20-*b*, 20-*c*, and 20-*d* reach saturation (overexposure) faster than the image at the viewpoint corresponding to the pixel 20-*n*. Thus, one or more of pixels at four corners in a similar shading state to the pixel 20-*a* and the pixel 20-*e* or the pixel 20-*n* are selected (as a reference) so that the images are not easily saturated (overexposed).

On the other hand, when the subject is dark, a light flux hardly penetrates the pixel 20-*n*. Thus, the image at the viewpoint corresponding to the pixel 20-*n* is underexposed faster. One or more of the pixels 20-*b*, 20-*c*, and 20-*d*, or pixels around the center and with an aperture ratio of 100% are selected (as a reference) so that the images are not easily underexposed.

More specifically, the dynamic range can be expanded by respectively selecting the pixels with a relatively low aperture ratio and the pixels with a relatively high aperture ratio in the bright subject and the dark subject.

A difference among the aperture ratios of the pixels under the ML, described above, is determined depending on positions of the pixels relative to the corresponding ML. Therefore, as actual pixel selection control, the pixels are selected based on the positions relative to the corresponding ML, to select pixel values corresponding to the brightness of the image at a target position.

Further, the shading state as illustrated in FIG. 2B is determined depending on only a state of the imaging apparatus 1, and does not depend on the subject. More specifically, the shading state can be previously known (predetermined). Therefore, brightness correction and blur correction can be performed, as described above referring to FIGS. 3A and 3C. The shading state may be obtained from so-called numerical values in design, or may be measured in manufacturing test processes of the imaging apparatus 1 in a factory. Obtained shading information, together with data representing a gain for compensating for shortage in amount of light due to shading and an exposure level difference for the pixel with no shading, is recorded as a table data (look-up table) in a memory of the memory control unit 8.

Figure 3A:
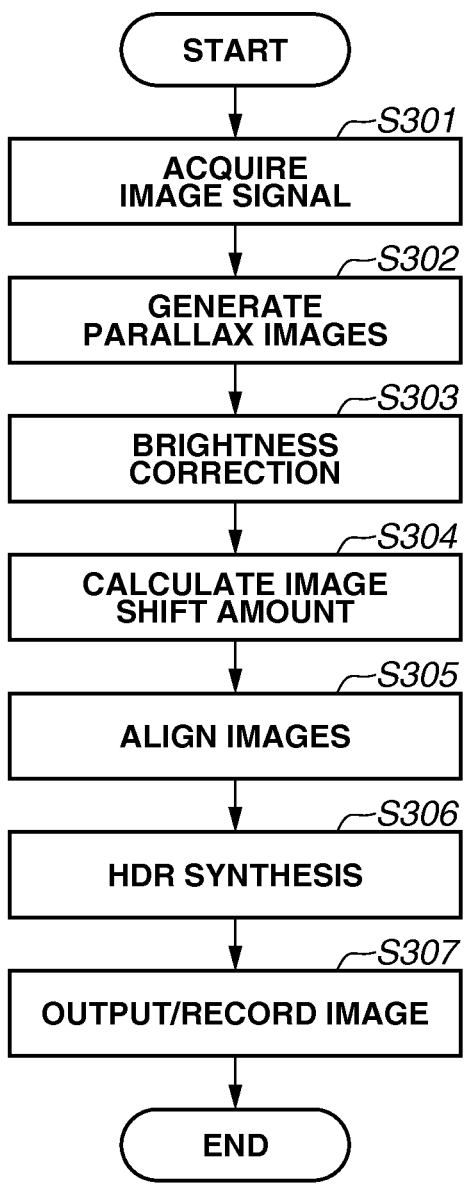
FIGS. 3A, 3B, and 3C are respectively a flowchart and diagrams illustrating HDR synthesis processing according to the first exemplary embodiment.

FIG. 3A is a flowchart illustrating an imaging and recording operation of the imaging apparatus 1 according to the present exemplary embodiment. Processes in the flow are respectively implemented by the camera system control circuit 5 or by each unit in response to an instruction from the camera system control circuit 5. An operation in the flow is started when the operation detection unit 10 detects power-on of the imaging apparatus and an instruction to start imaging to the imaging apparatus 1.

In step S301, the camera system control circuit 5 acquires an image signal that has been captured by the image sensor 6 and processed by the image processing circuit 7. A timing at which an image of the acquired image signal is not limited. An image signal of an image previously captured may be stored in the memory of the memory control unit 8 and read out.

In step S302, the camera system control circuit 5 or the image processing circuit 7 generates a plurality of images (parallax images) captured at different viewpoints from the image signal obtained simultaneously by the image sensor 6. As described with reference to FIGS. 2A-2C, light fluxes received by pixels at similar relative positions in an ML pass through the same area on a pupil plane of the imaging optical system 3. Thus, an image at a certain viewpoint can be generated by collecting the pixel signals at the similar relative positions in the ML. If this processing is similarly performed for each of the pixels under each ML in the MLA 20, a plurality of images captured at different viewpoints can be generated.

In step S303, the image processing circuit 7 performs brightness correction for adjusting a difference in brightness among the parallax images due to a difference in shading state. As described above, the shading state greatly differs depending on the relative position of a given pixel under the ML. Thus, the plurality of images captured at the different viewpoints differs in brightness. Thus, to synthesize the plurality of images captured at the different viewpoints to generate an HDR image, the brightnesses of the plurality of images captured at different viewpoints are adjusted in this step. In the present exemplary embodiment, a gamma value for raising an output more with respect to an input signal is totally applied to the image at the viewpoint with larger shading, to correct the brightness in the gamma correction. How much the image captured at each of the viewpoints has been shaded and to what extent the brightness of the image is to be corrected are determined for each pixel under each ML from the table data stored in the memory, as described above. The brightness of each of the parallax images may be corrected by performing gain correction for uniformly raising signal levels to a signal value of the parallax image. While only a case where luminance correction is performed is described in the example illustrated in FIG. 3A, the luminance correction is not an indispensable operation, as some pixels may not require luminance correction.

In step S304, the camera system control circuit 5 or the image processing circuit 7 performs processing for calculating an image shift amount for aligning the plurality of images captured at different viewpoints. More specifically, one of the plurality of images captured at the different viewpoints is used as a reference image, to search for a position, which matches the reference image, of the other image and to calculate an image shift amount. Each of the plurality of images, which is an output in step S303, is divided into a plurality of areas, and calculation is performed for each of the areas. A so-called epipolar constraint exists between the images captured at the different viewpoints simultaneously acquired, and the search is performed only in the constrained direction. If the images, which respectively pass through the area 30-a and the area 30-e on the pupil plane illustrated in FIG. 2C, are compared with each other, a viewpoint position is shifted only in an X direction. Therefore, a search direction can be limited to the X direction. More specifically, an area image is cut out from the image corresponding to the area 30-a, and an image of the same size is cut out at a position that is shifted in the X direction from the image corresponding to the area 30-e, and the images are compared with each other. In the comparison, most similar positions are found using a sum of absolute difference (SAD) between the images based on luminance values in the areas, to calculate a shift amount.

If the luminance correction is not performed in step S303, matching may be performed using a characteristic amount, which is not affected by brightness, represented by Scale-Invariant Feature Transform (SIFT). In an operation for calculating a shift amount, the same physical amount as an evaluation value obtained in correlation calculation performed during so-called phase different focusing is observed. Thus, subject distance information relating a subject can also be acquired.

An image shift amount between corresponding areas in the images captured at the different viewpoints differs depending on at which subject distance the subject exists. The larger the subject distance is, i.e., the farther the subject exists, the larger the image shift amount between the images captured at the different viewpoints is, in the same focus state. The subject at an equal distance from the imaging apparatus 1 is not necessarily captured in a general image. Thus, in the present exemplary embodiment, the image is divided into a plurality of areas and most similar positions are respectively found in the areas to cope with the fact that the subject distance of the subject differs for each of the areas.

In step S305, the camera system control circuit 5 or the image processing circuit 7 performs alignment processing for aligning the plurality of images captured at the different viewpoints for each of the areas. In step S304, it is found which area of the other image matches the reference image in the same subject. Therefore, in step S305, pixels corresponding to the same object are associated with one another.

In step S306, the camera system control circuit 5 or the image processing circuit 7 performs HDR synthesis processing for selecting, from among a plurality of pixels composing the other image corresponding to each of the areas of the reference image, the pixels to expand the dynamic range, and synthesizing the selected pixels. In step S305 and the preceding steps, the pixels corresponding to the same subject are associated with one another between the images captured at the different viewpoints. Thus, the pixels, the number of which is one or more and is the number of the viewpoints or less, are selected depending on the brightness (luminance value). In the present exemplary embodiment, the pixel corresponding to a viewpoint with a relatively low aperture ratio, which is not easily overexposed, is used as a reference, to select the pixels depending on the brightness. If the pixel with a too low aperture ratio, e.g., an aperture ratio of 10% or less is used as a reference, the brightness may not be able to be correctly measured due to effects of shading occurring in a portion having a large height of an image and eccentricity of a lens. Accordingly, in the present exemplary embodiment, among the plurality of pixels corresponding to each of the MLs, the pixel at which the area of a light flux incident from the ML is within a predetermined range is used as a reference of the brightness.

Figure 3B:
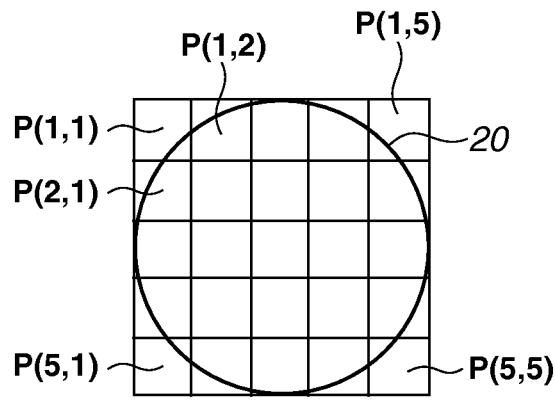
Figure 3C:
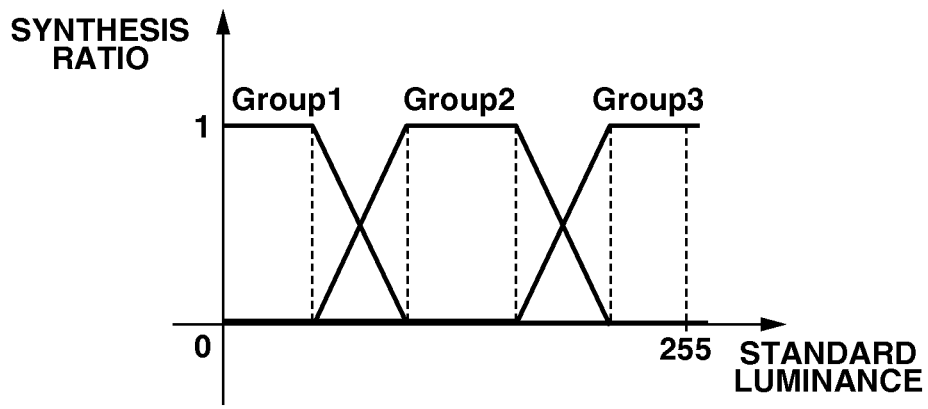

When a pixel is selected according to the brightness of pixels composing an image at a viewpoint used as a reference, the pixels respectively corresponding to 5×5 viewpoints are classified into three groups depending on a difference in aperture ratio, as illustrated in FIG. 3B, for example, and the pixel in the corresponding group is selected depending on the brightness according to a graph illustrated in FIG. 3C. A method for classifying pixels corresponding to each of the MLs depending on a difference in aperture ratio and their positions in an actually controlled manner is not limited to this. For example, Group 1 and Group 2 in FIG. 3B may be integrated, to select a pixel P(2, 2)-P(4, 4) in a central portion where there is no shading by an area other than the ML as a pixel having an intermediate luminance in which a main subject exists at a high probability.

Values of the selected pixels are weighted and added according to an aperture ratio and a pixel value of each of the pixels, to generate pixels composing an output image. More specifically, a correction width of the pixel with a low aperture ratio by the brightness correction in step S303 is large so that noise also increases. Therefore, the weighting is decreased. If each of the pixels is underexposed or overexposed, a weight is made to zero or small, to reduce an effect of the pixel. An image exceeding an expression range of the pixel values before processing is generated by weighting and adding the pixel values. Thus, the image is converted to match the dynamic range of the output image using an appropriate method. So-called dynamic range compression is performed. The pixel values may be normalized and weighted and added according to the number of pixels previously selected while the dynamic range compression is simultaneously performed.

In step S307, an output image for display or recording is generated, and displayed or recorded by performing resizing or gamma correction for a display image or coding processing in a predetermined format such as Joint Photographic Experts Group (JPEG), to end the processing.

Figure 4A:
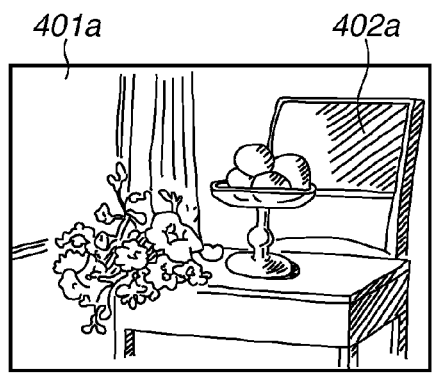
FIGS. 4A, 4B, 4C, 4D, 4E, and 4F illustrate effects of HDR synthesis.
Figure 4B:
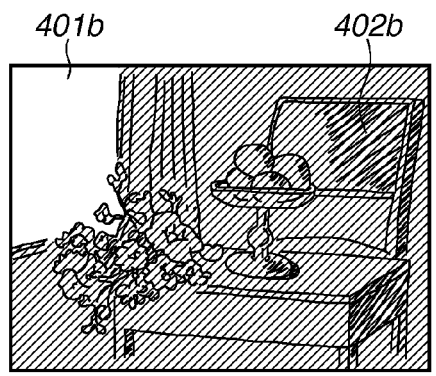
Figure 4C:
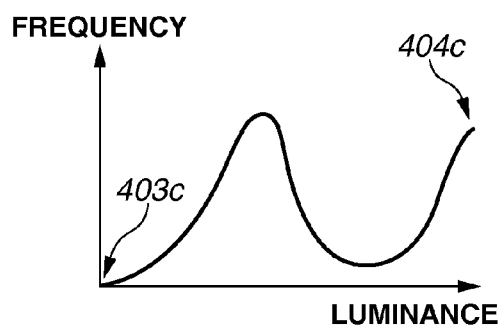
Figure 4D:
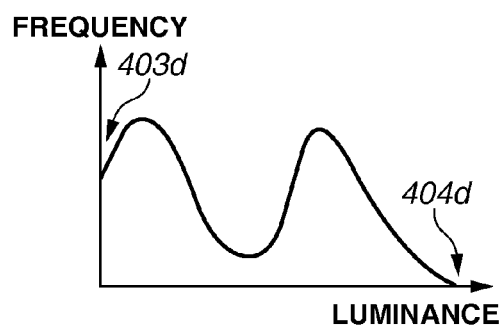
Figure 4E:
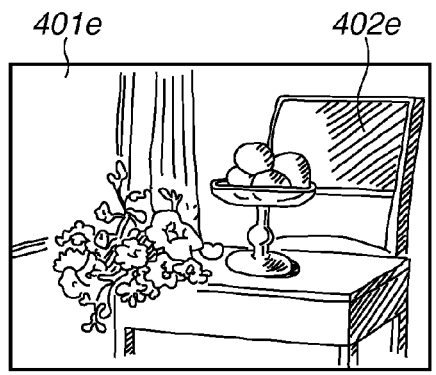
Figure 4F:
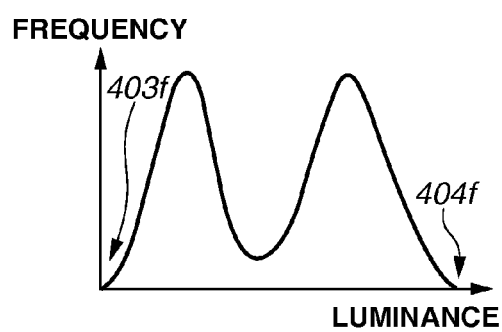

An effect of the HDR synthesis processing performed in step S306 in the present exemplary embodiment will be described in association with an image with reference to FIGS. 4A to 4F. FIG. 4A schematically illustrates an image at a viewpoint with a high aperture ratio. FIG. 4B schematically illustrates an image at a viewpoint with a low aperture ratio. FIGS. 4C and 4D are respectively luminance histograms corresponding to FIGS. 4A and 4B, respectively. FIG. 4E schematically illustrates an output image, and FIG. 4F is a luminance histogram corresponding to FIG. 4E. In FIGS. 4A and 4B, the images are respectively captured at the different viewpoints. Therefore, positions on image planes change depending on a subject distance. FIG. 4 will be described, assuming that the images have been aligned in FIG. 4.

In FIG. 4A, the image includes a bright area 401a and a dark area 402a. In FIG. 4B, the image includes a bright area 401b and a dark area 402b. In a composition illustrated in FIG. 4, the inside of a room and the outside of a window are simultaneously imaged. Thus, a dynamic range of a subject is wide.

While FIG. 4C is a luminance histogram c FIG. 4A, a portion 403 is to be paid attention to. In a portion 404c, a luminance takes a maximum value, but a frequency is not zero. Therefore, pixels, which have been saturated, exist. Pixels corresponding to the outside of the window serving as the bright area 401a in the image illustrated in FIG. 4A are saturated. On the other hand, in a portion 403c, a luminance takes a minimum value, but a frequency is substantially zero. Therefore, pixels are not underexposed, and can be exposed under an appropriate condition for a subject inside the room including the dark area 402a in the image.

On the other hand, while FIG. 4D is a luminance histogram corresponding to FIG. 4B, a portion 404 is to be paid attention to. In a portion 403d, a luminance takes a minimum value, but a frequency is not zero. Therefore, pixels, which have been underexposed, exist. Pixels corresponding to a shadow inside the room serving as the dark area 402b in the image illustrated in FIG. 4B are underexposed. (An acquired image is described in halftone to make a correspondence between the image and the subject definite in FIG. 4, although it is correct to represent the image in black when the pixels are underexposed). On the other hand, in a portion 404d, a luminance takes a maximum value, but a frequency is substantially zero. Therefore, pixels are not saturated, and can be exposed under an appropriate condition for the outside of the window serving as the bright area 401b in the image.

As apparent from the description with reference to FIGS. 4A to 4D, the bright area and the dark area of the subject may be respectively obtained from the image at the viewpoint with the low aperture ratio illustrated in FIG. 4B and the image at the viewpoint with the high aperture ratio illustrated in FIG. 4A. This processing is performed in step S306 in the flowchart illustrated in FIG. 3A. A value used for an output image is selected from an image at an appropriate viewpoint while seeing an aperture ratio depending on a luminance of pixels. Further, the images are integrated while considering the aperture ratio so that an output image illustrated in FIG. 4E can be obtained. A method for the integration has been described above in step S307.

In FIG. 4E, an image includes a bright area 401e and a dark area 402e. Saturation and underexposure do not occur in any place. As a result, even in FIG. 4F serving as a luminance histogram corresponding to FIG. 4E, respective frequencies in a portion 403f where a luminance takes a minimum value and a portion 404f where a luminance takes a maximum value are substantially zero.

As described above, according to the present exemplary embodiment, an image sensor, which receives a light flux from each of MLs in an MLA arranged between a imaging optical system and a plurality of pixels, at the plurality of pixels can simultaneously acquire a plurality of images captured at different viewpoints and can perform HDR synthesis based on a difference in shading state among the images.

In the present exemplary embodiment described above, to reduce an effect of shading corresponding to an image height not by an ML, well-known shading correction may be performed during the image acquisition in step S301 using a correction table previously storing a correction gain corresponding to the image height.

In a second exemplary embodiment, a diaphragm in an imaging optical system 3 is adjusted, to control aperture ratios of images captured at different viewpoints and to control exposure of each of the images and an exposure level difference between the images.

Figure 5A:
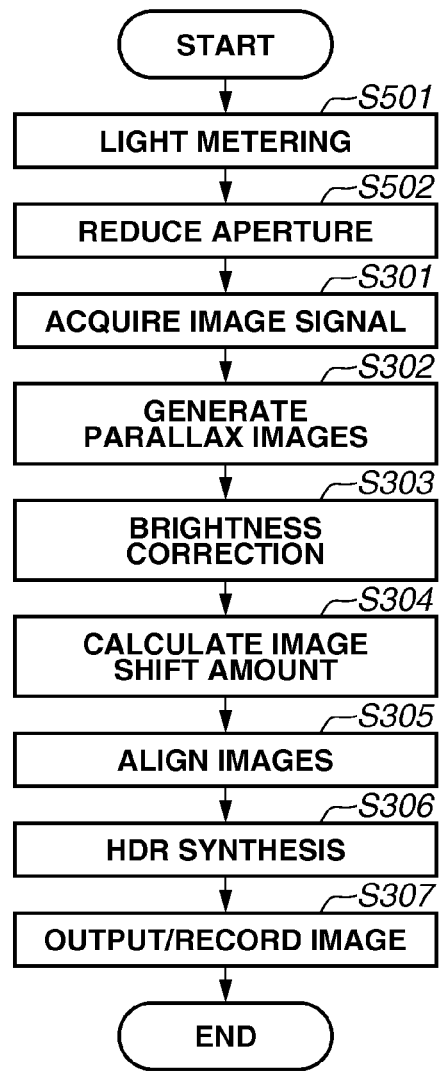
FIGS. 5A and 5B are respectively a flowchart and a diagram illustrating a process performed to change an aperture by a operating a diaphragm according to a second exemplary embodiment.

FIG. 5A is a flowchart illustrating an imaging and recording operation of an imaging apparatus 1 according to the present exemplary embodiment. Each of processes in the flow is implemented by a camera system control circuit 5 or by each unit in response to an instruction from the camera system control circuit 5. In the flow, an operation detection unit 10 detects power-on of the imaging apparatus or an instruction to start imaging to the imaging apparatus 1, to start the operations. In FIG. 5A, steps in which similar operations to those illustrated in FIG. 3A are performed are assigned the same numbers, and description of portions respectively having similar functions is not repeated, and only different portions will be described.

In the processing illustrated in FIG. 5A, steps S501 and S502 are provided before step S301.

In step S501, an image sensor 6 or a light metering sensor (not illustrated) performs light metering in response to the instruction from the camera system control circuit 5. Various methods can be used for the light metering. However, a method for exposing the image sensor 6 prior to main imaging will be described below. A dynamic range of a subject included in an image can be known by exposing the image sensor 6 under an appropriate condition (referred to as light metering exposure) to observe its signal level.

In step S502, the diaphragm in the imaging optical system 3 is operated in response to the instruction from the camera system control circuit 5. A lens driving unit 13 illustrated in FIG. 1B is used, to operate a diaphragm included in a lens unit 2. To what extent the diaphragm is to be closed/opened will be described below.

As a result of the light metering exposure, if any of pixel exists within an appropriate range, a luminance of the subject is flat (luminance unevenness is small), and a dynamic range need not particularly be expanded. On the other hand, if the subject is saturated (overexposed) or underexposed (an area where electrons can hardly jump out due to the exposure) exist, the dynamic range is insufficient, or an exposure condition is not appropriate. In the light metering exposure, when the saturation and the underexposure simultaneously occur within a screen even if the exposure condition is appropriately adjusted, a luminance difference of the subject is larger than the dynamic range of the image sensor 6, and a dynamic range of the subject is worth being expanded. When the saturation and the underexposure occur even if the exposure condition is appropriately adjusted, as described above, the image sensor 6 is exposed under more underexposure (small exposure amount) and overexposure (large exposure amount) conditions. As a result, a dynamic range required to sufficiently represent the subject (defined as a dynamic range of the subject) can be known by searching for the condition that the saturation and the underexposure are eliminated.

To solve the saturation (overexposure) and the underexposure, the image may be able to be acquired under the condition that the exposure is changed to include the dynamic range of the subject. In an apparatus that performs exposure under different conditions in a time-divisional manner to synthesize images, an exposure condition is determined according to the dynamic range of the subject as ±1 step, ±2 steps, or ±3 steps, to acquire a plurality of images, and the image processing is performed on the images. On the other hand, it is not easy in the apparatus according to the present exemplary embodiment to control an amount of exposure for each image, like in a time-divisional or multiple-lens camera. An example illustrated in FIG. 5B is an example of processing proposed by paying attention to that.

More specifically, the aperture of the optical system is reduced in step S502 after light metering is performed in step S501, to change a ratio of an amount by which a light beam penetrates (a ratio of luminances of a brightest viewpoint and a darkest viewpoint). Consequently, a ratio of aperture ratios of images captured at different viewpoints changes, and an exposure condition including the dynamic range of the subject can be achieved. A relationship between the aperture size of the optical system and the change in the ratio of the amount by which the light beam penetrates will be described with reference to FIG. 5B.

Figure 5B:
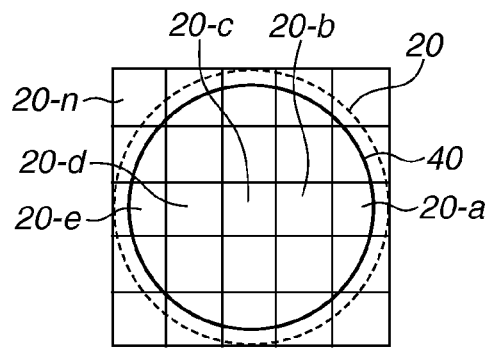

FIG. 5B illustrates a case where the diaphragm in the imaging optical system 3 is operated from the state illustrated in FIGS. 1A-1B. An exit pupil corresponding to a state after the diaphragm is operated has an outer diameter 40.

As apparent from FIG. 5B, when the diaphragm is operated to rapidly decrease an aperture ratio, shading increases starting at the outermost pixel. For example, FIG. 3B illustrates a diaphragm opened state with an outer diameter 20 where there is no shading caused by the diaphragm. From this state, an aperture of the diaphragm is only decreased by approximately 5% so that an aperture ratio of a pixel 20-$n$ is reduced to half or less. On the other hand, aperture ratios of pixels 20-$b$, 20-$c$, and 20-$d$ near the center remain 100%. As a result, a difference between the brightness of an image captured at a viewpoint corresponding to the pixel 20-$n$ and the brightness of images at viewpoints corresponding to the pixels 20-$b$, 20-$c$, and 20-$d$ further increases (an exposure level difference is larger). The diaphragm is appropriately operated according to the dynamic range of the subject, as described above, with reference to FIG. 3B, so that subject information can be grasped more approximately. As a method for determining the exposure condition, it can be determined, as needed, which pixel is a properly exposed pixel based on a light metering result.

As described above, according to the present exemplary embodiment, an image sensor, which receives a light flux from each of MLs in an MLA arranged between a imaging optical system and a plurality of pixels, can simultaneously acquire a plurality of images captured at different viewpoints, and perform HDR synthesis based on a difference in shading state among images. In the case, a diaphragm is controlled according to a light metering value so that an exposure level difference between the images at the viewpoints can be controlled.

In a third exemplary embodiment, correction for adjusting a defocused state by recognizing that the defocused state differs depending on a difference in aperture ratio among a plurality of images captured at different viewpoints and the defocused state changes with HDR synthesis processing for a composite image.

A flowchart illustrated in FIG. 6 will be described. In FIG. 6, steps in which similar operations to those illustrated in FIG. 3A are performed are assigned the same numbers, and description of portions respectively having similar functions is not repeated, and only different portions will be described. FIG. 6 illustrates an example of processing by particularly paying attention to the defocused state. Steps S601 and S602, described below, respectively pay attention to a difference in defocused state among a plurality of images captured at different viewpoints and a change in defocused state caused by dynamic range expansion processing.

In the processing illustrated in FIG. 6, steps S601 and S602 are respectively provided between steps S303 and S304 and between steps S307 and S308.

In step S601, aperture ratio correction is performed. The aperture ratio correction means that smoothing filtering for each area is performed on a plurality of images captured at different viewpoints based on a shading state of each of pixels. A difference in aperture ratio corresponds to the fact that the plurality of images at the different viewpoints has been captured using different F numbers. Further, if the F numbers become too large, a blur caused by diffraction occurs. Thus, the plurality of images captured at the different viewpoints differs in the defocused state. Therefore, in step S601, the plurality of images captured at the different viewpoints is subjected to smoothing filtering according to the shading state. When other images captured at different viewpoints are subjected to smoothing filtering using an image at a starting point corresponding to the pixel with the highest aperture ratio as a reference, similarity of the images can be increased. Thus, the images can easily and appropriately be made to match one another in the subsequent step S304.

In step S602, smoothing processing is performed on the entire image after the HDR synthesis obtained in step S306. The smoothing processing means performing smoothing filtering. As described above, in the dynamic range expansion processing in step S306, processing for selecting pixels, the number of which is one or more and is the number of viewpoints or less depending on the brightness, is performed. When the processing is performed, a blur of the image is reduced than that in a method for adding all images serving as a conventional method for generating an output image. A plurality of images captured at different viewpoints corresponds to areas obtained by dividing a corresponding pupil area. Thus, if one of the images is paid attention to, the image has been captured by increasing the F number (reducing an aperture of a diaphragm). When one of the plurality of images captured at the different viewpoints is paid attention to, the image has a large depth of focus and has a small blur. If pixels, the number of which is one or more and is the number of viewpoints or less, are selected and added, an image, whose blur is smaller than that when all the images are added, is output. Therefore, an output image is subjected to smoothing filtering according to an output of an alignment unit in step S602, to obtain an image to which an appropriate blur has been added as an output. As described above, in step S304, the same physical amount as a phase difference AF is observed. Therefore, a distance to the subject can be known. In the present exemplary embodiment, in step S304, not only an image shift amount but also a subject distance on the side of an object in each of the areas based on the image shift amount is calculated, and a blur is added to the image according to the subject distance. More specifically, a blur is not added to a focused area, and processing may be performed so that the subject that is far on an image plane from a focus position becomes smoother.

Through this processing, a blur, which is similar to that in the conventional technique, is obtained, and an output image corresponding to the intension of a user can be obtained. Further, the extent of the smoothing processing to be performed in step S602 may be adjusted depending on setting of the output image. More specifically, if an image having a small blur is desired to be obtained, the smoothing processing is weakly performed. If an image having a large blur is desired to be obtained, the smoothing processing may be strongly performed.

As described above, according to the present exemplary embodiment, an image sensor, which receives a light flux from each of MLs in an MLA arranged between an imaging optical system and a plurality of pixels, can simultaneously acquire images at different viewpoints and perform HDR synthesis based on a difference in shading state among the images. In this case, correction for adjusting a defocused state is further performed by recognizing that the plurality of images captured at the different viewpoints differs in defocused state according to a difference in aperture ratio and the defocused state changes with the HDR synthesis processing for a composite image. Thus, the defocused state for each imaging or for each area can appropriately be adjusted.

In a fourth exemplary embodiment, pixels with the same aperture ratio are added to form a difference in exposure, thereby enabling synthesis processing in addition to the first exemplary embodiment.

Figure 7A:
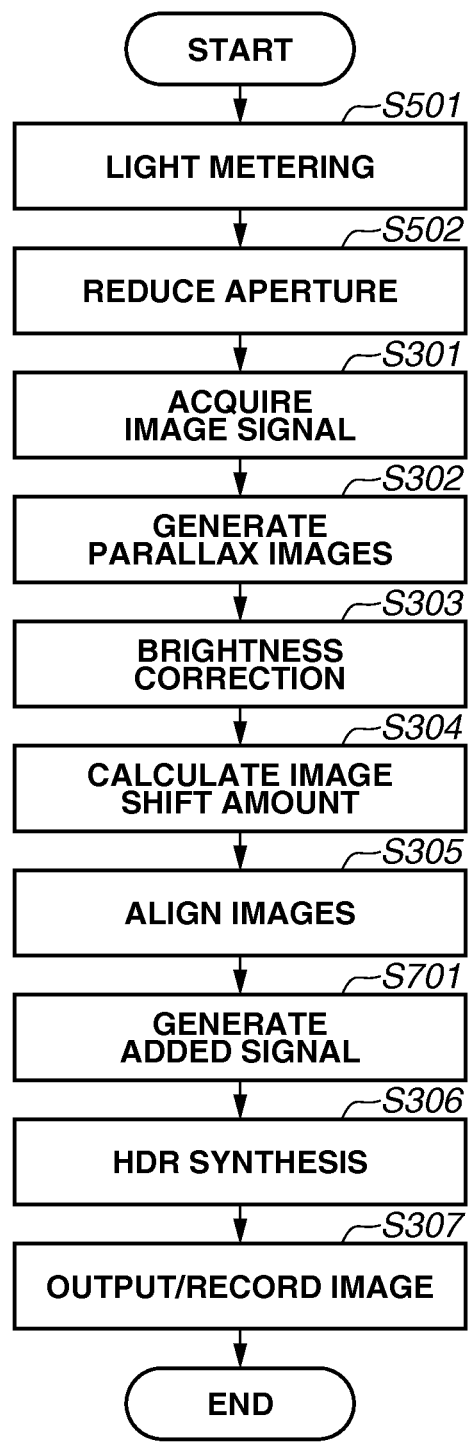
FIGS. 7A, 7B, and 7C are respectively a flowchart and diagrams illustrating a pixel addition process according to a fourth exemplary embodiment.

FIG. 7A is a flowchart illustrating the processing according to the present exemplary embodiment. Each of steps is performed by a camera system control circuit 5 or by each unit according to an instruction from the camera system control circuit 5.

Figure 7B:
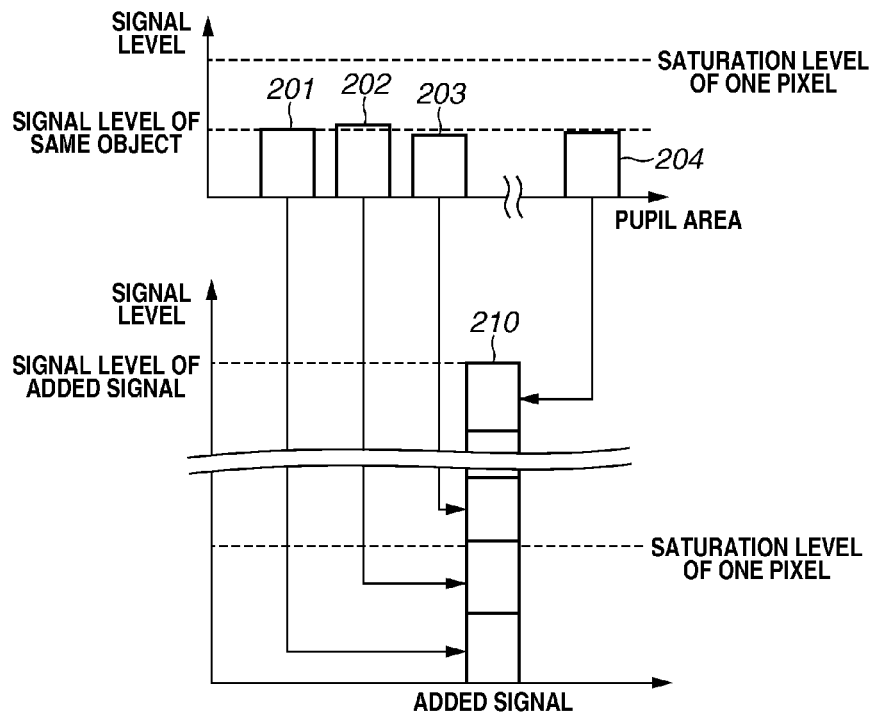

FIG. 7B schematically illustrates an operation of pixel addition. In FIG. 7A, blocks having similar functions to those illustrated in FIG. 1B are assigned the same numbers.

Figure 7C:
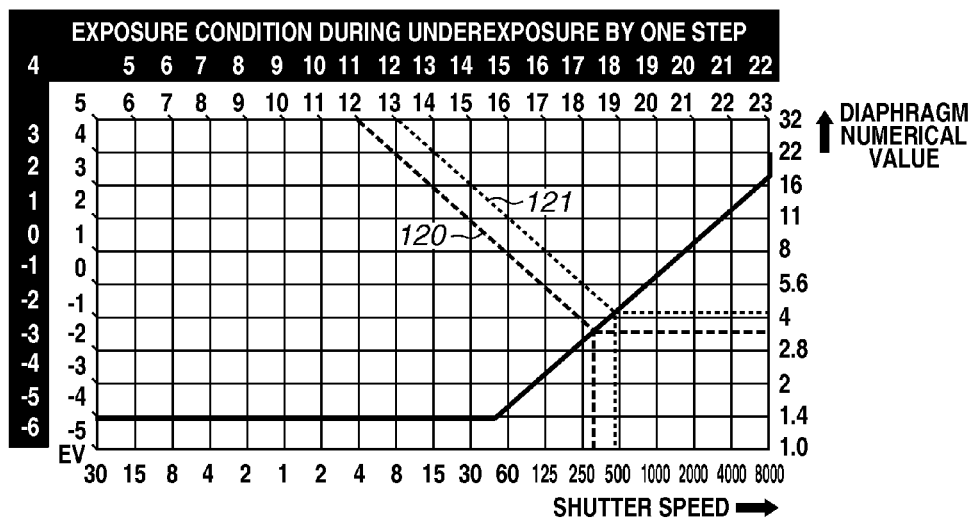

In the present exemplary embodiment, when a signal of each of pixels is saturated, a range expansion effect is not obtained. Therefore, in light metering in step S501 illustrated in FIG. 7A, each of parallax images is set to be exposed under an underexposure condition so that the pixel is hardly saturated. In an imaging apparatus 1, an aperture and a shutter speed are set using a program diagram so that a dynamic range of an image sensor 6 can effectively be used for an Ev value obtained from a light metering value. This condition is referred to as a proper exposure condition. When the diaphragm is narrowed down or the shutter speed is increased for the above-mentioned condition, an amount of light reaching the image sensor 6 can be reduced. Such an exposure condition is referred to as an underexposure condition. The parallax image is in a dark state by being underexposed. However, the number of pixels to be saturated can be reduced. FIG. 7C illustrates an example of a program diagram. (This diagram changes depending on the type of lens, for example). According to this diagram, when an Ev value is 12, an exposure condition is determined along a dot line 120. Imaging is performed using an F number of 3.5 and a shutter speed of 1/320 s. When the parallax image is underexposed, an exposure condition is determined along a dot line 121 by referring to a position of outline characters. As a result, imaging is performed using an F number of 4.0 and a shutter speed of 1/500 s.

In step S701, addition and synthesis processing is performed. Luminances of the pixels, which have been associated with one another in step S305, are added. A specific image of this operation has been illustrated in FIG. 7B, and will be described below.

In step S306 illustrated in FIG. 7A, an added signal obtained in step S701 increases in level by the addition. Therefore, the added signal is converted to match the dynamic range of an output image. An output pixel signal is then selectively output, like in the other exemplary embodiments, according to the brightness of a reference image for each area, to perform HDR synthesis.

An operation of a pixel addition unit will be described with reference to FIG. 7B. In a graph illustrated in an upper part of FIG. 7B, a vertical axis and a horizontal axis respectively correspond to a luminance and a pupil area. Bar graphs illustrated in the upper part of FIG. 7B respectively represent signal levels of pixels that correspond to the same object and have passed through different pixel areas. For example, light fluxes, which have respectively passed through pixels 20-$a$, 20-$b$, . . . , 20-$e$ in FIG. 2C and correspond to the same object, are collected. In the optical system illustrated in FIG. 2C, when the object and an MLA 20 are at conjugate positions by a lens unit 2 (in a focused state of a conventional camera), pixels under the same microlens correspond to the same object while the light rays thereto passing through different pupil areas. In such a case, signals of the pixels 20-$a$, 20-$b$, . . . , 20-$e$ are graphed. If the object and the MLA 20 are not at the conjugate positions by the lens unit 2, the pixels corresponding to light fluxes, which have passed through different pupil areas, and corresponding to the same object, exist under another microlens. These relationships are associated with each other in steps S304 and S305 illustrated in FIG. 7A. More specifically, an arrangement of the luminances of the pixels, which have been associated with one another in step S305, is the graph in the upper part of FIG. 7B. In an example illustrated in FIG. 7B, the bar graphs respectively represent signal levels 201, 202, 203, and 204 that have passed through different pupil areas.

In a graph in a lower part of FIG. 7B, a vertical axis corresponds to a luminance. The graph in the lower part of FIG. 7B is obtained by adding the bar graphs in the upper part of FIG. 7B. An added signal 210 is a vertical stack of the signal levels 201, 202, 203, and 204 of the pixels obtained from the light fluxes that have passed through the different pupil areas. As apparent from FIG. 7B, the added signal 210 has a signal level exceeding a saturation level considered in a pixel unit. A range is expanded toward the higher luminance side than that in an image obtained by collecting the pixel signals (corresponding to the parallax image generated in step S302 illustrated in FIG. 7A).

Figure 8A:
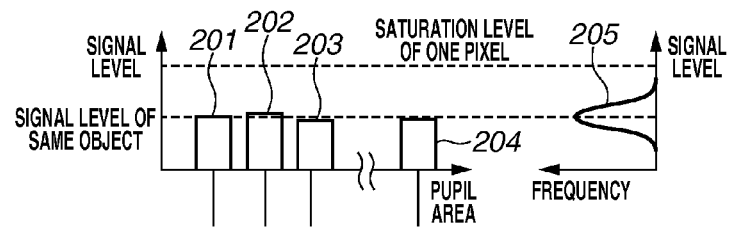
FIGS. 8A, 8B, 8C, and 8D illustrate addition of pixel values and a distribution (variation) of luminances.
Figure 8B:
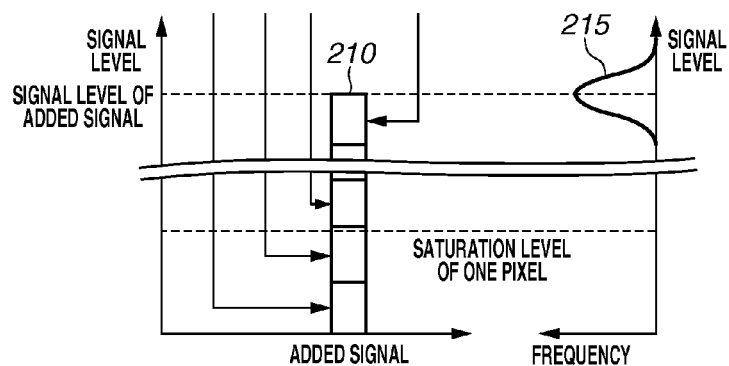
Figure 8C:
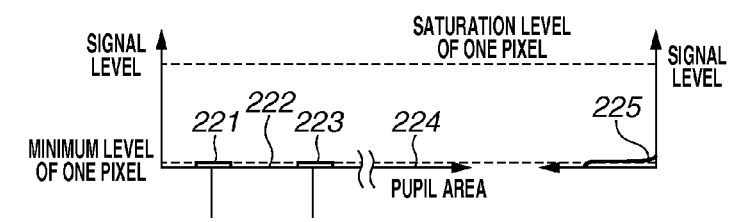
Figure 8D:
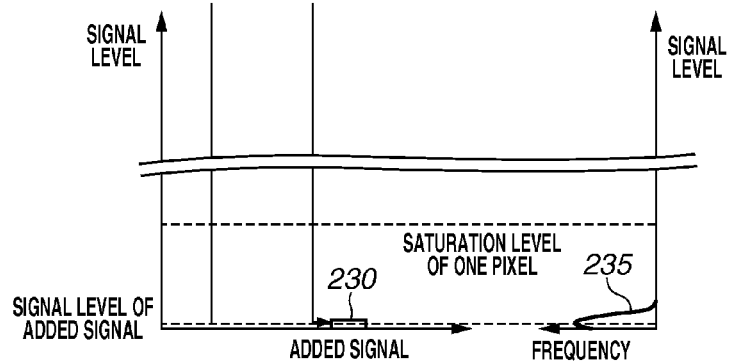

A variation among signals and a situation where a subject having a low luminance is acquired will be described below with reference to FIGS. 8A, 8B, 8C, and 8D. FIGS. 8A and 8B correspond to FIG. 7B, where a signal of a subject having an intermediate luminance is acquired. FIGS. 8C and 8D illustrate a state where a signal of a subject having a low luminance is acquired, although similar in a notation method to FIGS. 8A and 8B.

In FIGS. 8A and 8C, graphs with a luminance on the vertical axis and a pupil area through which a light flux corresponding to a pixel has passed and a frequency on the horizontal axis are written side by side in a horizontal direction. FIGS. 8B and 8D are graphs respectively illustrating added signals corresponding to FIGS. 8A and 8C and with a luminance on the vertical axis.

In FIG. 8A, signal levels 201, 202, 203, and 204 of pixels respectively corresponding to light fluxes, which have passed through different pupil areas, and corresponding to the same object are not exactly identical and are written while slightly shifting from one another. This indicates that the signal level of each of the pixels is acquired through probabilistic processes. The number of free electrons generated by a photon, which has reached a photo diode (PD) surface of the image sensor 6, has been grasped. At this time, the generation of the free electrons is controlled by the probabilistic processes, and is controlled by a Poisson distribution. More specifically, even if the same number of photons reaches the PD surface, the same number of free electrons is not necessarily generated. The generation of the free electrons follows a certain probability distribution. If the number of events is large, the Poisson distribution approaches a normal distribution. A representation of this in the form of a probability density function is a graph 205 on the right side of FIG. 8A. The graph 205 spreads with a certain distribution centered around an average value determined by the brightness of the subject.

The signal levels 201, 202, 203, and 204 of the pixels, which respectively correspond to the different pupil areas, are added, to obtain the graph in FIG. 8B. A signal level 210 is obtained by adding the signal levels 201, 202, 203, and 204. A distribution is obtained by adding variances. This is represented as a graph 215. The graph 215 is illustrated as a distribution whose bottom is somewhat wider than the graph 205 in the upper part. This makes a user feel as if a variation increased. However, the signal level increases in proportion to an addition number. On the other hand, a standard deviation obtained by adding variances increases only by its square root. Thus, the addition can suppress the variation in terms of signal to noise ratio (S/N).

A subject having a low luminance will be described below with reference to FIGS. 8C and 8D. Examples of FIGS. 8A, 8B, 8C, and 8D respectively illustrate situations where a signal level with the minimum resolution of each of pixels is obtained with a probability of 50%. In the example illustrated in FIG. 8C, the signal levels with the minimum resolution of the pixels corresponding to light fluxes, which have passed through pupil areas 221 and 223, are output, and the signal levels of the pixels corresponding to light fluxes, which have passed through pupil areas 222 and 224, are zero (i.e., the pixels are underexposed). A Poisson distribution in such a case is in a shape, whose bottom is pulled toward one side by adhering to an axis on one side, as illustrated in a graph 225.

If the signals in this case are added, a signal 230 is obtained. The signal 230 has a level higher than the signal level with the minimum resolution by the addition, and also has a probability distribution 235. The larger the number of pupil areas to be added is, the lower the probability that the probability distribution 235 reaches zero becomes. Thus, the occurrence of underexposure is reduced. As a result, a range is also expanded toward the low luminance side.

Figure 9A:
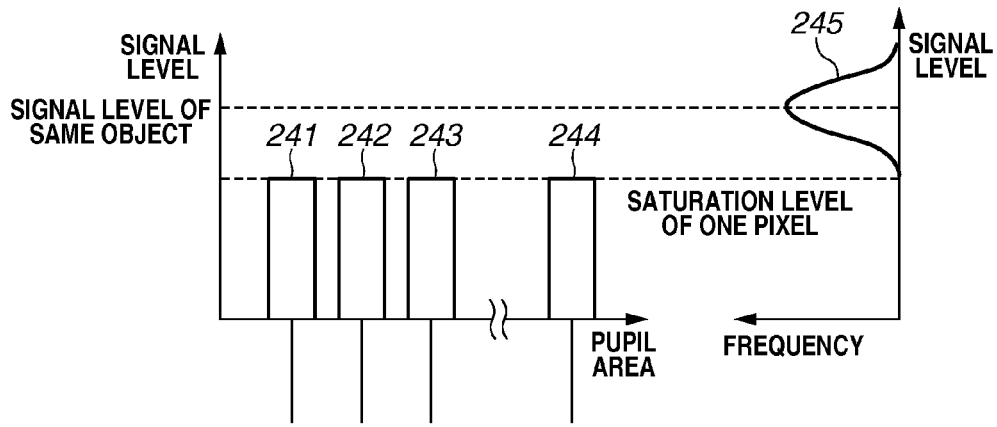
FIGS. 9A and 9B illustrate a case where pixels have been saturated.
Figure 9B:
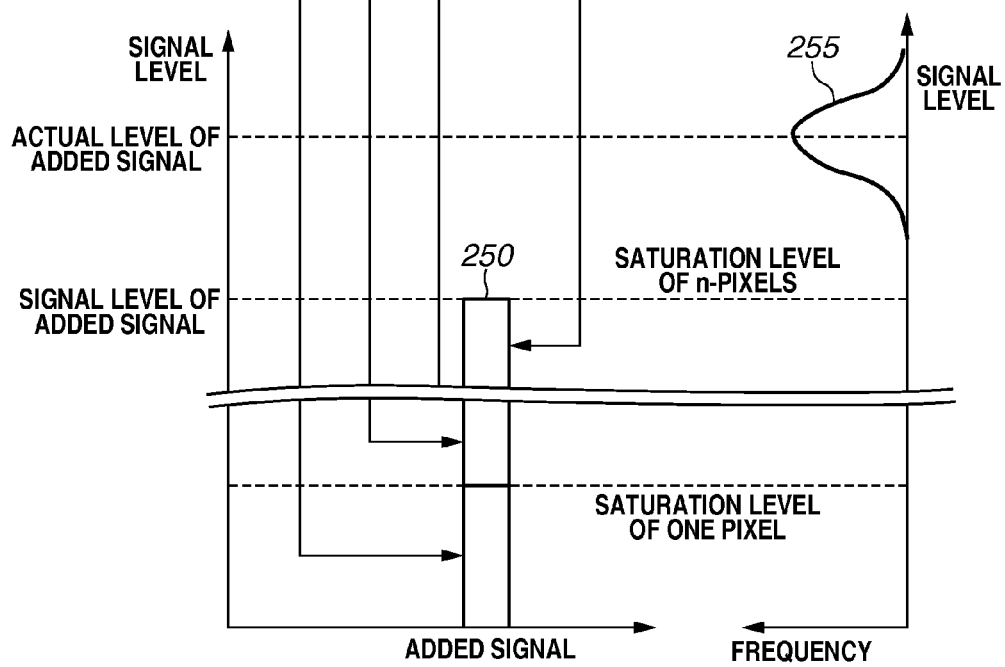

A behavior of signals during saturation will be described below with reference to FIGS. 9A and 9B. Notation methods illustrated in FIGS. 9A and 9B are respectively similar to those illustrated in FIGS. 8A and 8B. However, FIGS. 9A and 9B illustrate an acquisition state of a signal of a subject in which pixels are saturated.

If the subject as illustrated in FIGS. 9A and 9B is imaged, as described referring to FIGS. 8A, 8B, 8C, and 8D, signal levels of the pixels are to be distributed according to a probability distribution 245. However, the signal levels exceed a saturation level of one pixel. Thus, the signal levels are cut off at a saturation level, like signal levels 241, 242, 243, and 244 illustrated in FIG. 9A. If the signal levels are added, as illustrated in FIG. 9B, a signal 250 obtained by adding the n pixels has a signal level equal to a saturation level of the n pixels. Only a lower value than the level of an added signal obtained when there is no saturation can be obtained, and an accurate brightness and color cannot be expressed. In this case, an effect of range expansion has not been obtained.

Under a general imaging condition, no problem may occur if pixels, which are saturated when exposed in so-called proper exposure, are represented as sufficiently bright luminance points. On the other hand, if a range expansion effect according to the present exemplary embodiment is desired to sufficiently be obtained and if a luminance point itself is desired to accurately be acquired, like in a starry sky, the pixels are effectively prevented from being saturated when exposed under an underexposure condition. In the example of the operation illustrated in FIG. 7A, the exposure is performed under an underexposure condition in step S501.

The present invention is not limited to an apparatus having imaging as its principal objective, such as a digital camera. The present invention is applicable to any apparatus, which contains an imaging apparatus or to which an imaging apparatus is externally connected, such as a personal computer (of a lap top type, a desk top type, a tablet type, etc.) or a game machine. Therefore, an "imaging apparatus" in the present specification is intended to include any electronic apparatus having an imaging function.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2013-267152 filed Dec. 25, 2013, and No. 2014-186868 filed Sep. 12, 2014, which are hereby incorporated by reference herein in their entirety.

What is claimed is:

1. An imaging apparatus comprising:
an image sensor including a microlens array between an imaging optical system and a plurality of pixels each of which is designed to be conjugate to a specific area on an exit pupil of the imaging optical system by the microlens array, and configured to receive a light flux from each of microlenses in the microlens array at the plurality of pixels to output an image signal; and
a generation unit configured to select, among a plurality of pixel signals output from the image sensor, a pixel signal based on brightness of the pixel signals and positions of pixels relative to each of the microlenses, to generate an output image.

2. The imaging apparatus according to claim 1, further comprising a parallax image generation unit configured to generate a plurality of image signals obtained at different viewpoints from the image signal from the image sensor,
wherein the generation unit selects, among a plurality of corresponding pixel signals in the image signals of the plurality of images captured at the different viewpoints, the pixel signals based on the brightness of the pixel signal in the image signal at the viewpoint serving as a reference and the positions of the pixels at which the plurality of pixel signals is output relative to each of the microlenses, and synthesizes the selected pixel signals.

3. The imaging apparatus according to claim 1, further comprising a parallax image generation unit configured to generate the image signals obtained at the different viewpoints from the image signal from the image sensor,
wherein the generation unit, according to the brightness of the pixel signal, generates the output image using a pixel signal obtained by adding the plurality of corresponding pixel signals in the image signals obtained at the plurality of viewpoints.

4. The imaging apparatus according to claim 1, further comprising a luminance correction unit configured to correct, for the pixel signal serving as an output from each of the pixels on the image sensor, a luminance based on the position of the pixel relative to each of the microlenses at the pixels.

5. The imaging apparatus according to claim 2, further comprising a filter unit configured to subject the image signals of the plurality of images captured at the different viewpoints to smoothing filtering based on the position of each of the pixels on the image sensor relative to each of the microlenses.

6. The imaging apparatus according to claim 1, further comprising a light metering unit configured to determine an exposure condition for imaging by the image sensor,
wherein an exposure level difference between the pixels on the image sensor is determined based on an output of the light metering unit, to drive a diaphragm based on the exposure level difference and to acquire the image signal.

7. The imaging apparatus according to claim 2, further comprising an alignment unit configured to align, for the image signals of the plurality of images captured at the different viewpoints, subjects in the images,
wherein the generation unit selects, among the plurality of corresponding pixel signals for each area in the plurality of images captured at the different viewpoints aligned by the alignment unit, the pixel signals and synthesizes the selected pixel signals, to generate an output image.

8. The imaging apparatus according to claim 7, wherein the alignment unit compares the image signal at the viewpoint serving as a reference among the image signals of the plurality of images captured at the different viewpoints with the image signal at the other viewpoint to calculate an image shift amount for each area, and align the subject in the area based on the image shift amount.

9. The imaging apparatus according to claim 7, further comprising a second filter unit configured to subject the image signal to smoothing filtering based on the image shift amount calculated by the alignment unit.

10. The imaging apparatus according to claim 1, wherein among the plurality of pixels corresponding to each of the microlenses, the generation unit uses the pixel, in which the area of the light flux incident from the microlens is in a predetermined range, as a reference.

11. The image sensor according to claim 1, wherein the microlens array is arranged in two dimensions as viewed from an optical axis of the imaging optical system, and the pixels on the image sensor are further arranged in two dimensions as viewed from the optical axis relative to each of the microlenses.

12. The imaging apparatus according to claim 1, wherein among the pixels on the image sensor, the same color filter is used for the pixels corresponding to the same microlenses in the microlens array.

13. The image sensor according to claim 1, wherein the pixels on the image sensor are arranged in a Bayer array in a pixel unit, and the plurality of pixels corresponding to each of the microlenses includes an odd number of pixels and an odd number of pixels respectively arranged in both the length and the breadth of the microlens.

14. A method for controlling an imaging apparatus including an image sensor, the image sensor including a microlens array between an imaging optical system and a plurality of pixels each of which is designed to be conjugate to a specific area on an exit pupil of the imaging optical system by the microlens array, and being configured to receive a light flux from each of microlenses in the microlens array at the plurality of pixels to output an image signal, the method comprising:

specifying a plurality of pixel signals output from the image sensor corresponding to a same subject in the image signal;

selecting the pixel signals based on brightness of the pixel signals and positions of pixels relative to each of the microlenses; and generating an output image using the selected pixel signals.

15. A non-transitory computer-readable storage medium storing a program for causing a computer to execute the method for controlling the imaging apparatus according to claim 14.

16. An imaging apparatus comprising:

an image sensor including a plurality of pixels;

a microlens array including a plurality of microlenses, each of the microlens array arranged between an imaging optical system and the image sensor which is designed to be conjugate to a specific area on an exit pupil of the imaging optical system by the microlens array, each microlens projecting on a predetermined number of pixels of the image sensor an image of a subject captured at different viewpoints; and an image generation unit configured to generate an output image of the subject based on pixel signals output from the image sensor, wherein the image sensor outputs a plurality of pixel signals corresponding to a light flux received through each microlens in the microlens array, and the image generation unit selects among the plurality of pixels signals output from the image sensor, a pixel signal based on brightness of the pixel signals and positions of pixels relative to each of the microlenses.

* * * * *